United States Patent [19]

Takeuchi et al.

[11] Patent Number: 4,522,108
[45] Date of Patent: Jun. 11, 1985

[54] VACUUM BOOSTER DEVICE

[75] Inventors: Hiroo Takeuchi, Asashina; Nobuaki Hachiro; Yoshihisa Miyazaki, both of Ueda, all of Japan

[73] Assignee: Nissin Kogyo Kabushiki Kaisha, Nagano, Japan

[21] Appl. No.: 242,701

[22] Filed: Mar. 11, 1981

[30] Foreign Application Priority Data

Sep. 12, 1980 [JP] Japan .............................. 55-126996

[51] Int. Cl.³ ............................................. F15B 9/10
[52] U.S. Cl. .................................. 91/376 R; 92/98 D; 92/169
[58] Field of Search ........................ 91/369 A, 376 R; 92/13.8, 166, 98 D, 168; 60/547 R

[56] References Cited

U.S. PATENT DOCUMENTS

| | | | |
|---|---|---|---|
| 3,543,298 | 11/1970 | Rockwell | 91/369 A |
| 4,227,371 | 10/1980 | Takeuchi | 92/13.8 |
| 4,256,016 | 3/1981 | Thomas | 91/369 A |
| 4,328,738 | 5/1982 | Hamamatsu | 92/99 |
| 4,330,996 | 5/1982 | Becht | 91/376 R |
| 4,418,611 | 12/1983 | Tateoka | 92/169.3 |

FOREIGN PATENT DOCUMENTS

| | | | |
|---|---|---|---|
| 3027174 | 1/1981 | Fed. Rep. of Germany | 92/166 |
| 811006 | 3/1959 | United Kingdom | 60/547 |
| 2009871 | 6/1979 | United Kingdom | 92/165 PR |
| 2051270 | 1/1981 | United Kingdom | 92/166 |
| 2068067 | 8/1981 | United Kingdom | 92/166 |

*Primary Examiner*—Abraham Hershkovitz
*Attorney, Agent, or Firm*—Armstrong, Nikaido, Marmelstein & Kubovcik

[57] ABSTRACT

A vacuum type brake booster device comprising a first and a second working chambers defined in a booster shell by a booster piston, tie rods extending through the booster piston for connection of the front and rear walls of the booster shell so as to support loads on the booster shell, flexible bellows surrounding each of the tie rods and having opposite ends fixed respectively to the tie rod and the booster piston so that the inside of the bellows is communicated to the second working chamber, and an adjustable stop mechanism provided on an input rod for adjusting a retraction limit of the latter, whereby a control valve is held in a neutral position to keep the second working chamber out of communication with the first working chamber and the external atmosphere so that the bellows becomes expansive owing to a pressure difference between the working chambers for getting out of contact with the tie rod and, accordingly, for keeping the movement of the booster piston undisturbed.

2 Claims, 3 Drawing Figures

VACUUM BOOSTER DEVICE

BACKGROUND OF THE INVENTION

This invention relates to automotive brake master cylinder vacuum booster devices and, more particularly, to improvements in those of the type comprising a booster shell, an axially slidable booster piston accommodated in the booster shell, a first working chamber defined in the booster shell by the booster piston and held in communication with a source of vacuum supply, a second working chamber defined in the booster shell by the booster piston and selectively placed in communication with the first working chamber or the external atmosphere through a control valve means, and an input rod arranged opposite to the booster piston for movement toward and away from the latter and connected to the control valve means so as to produce a pressure difference between both the working chambers effective to cause the booster piston to follow forward movement of the input rod. Conventionally, when above type of the booster device is installed in an automobile, rear wall of the booster is fixed to the automobile the body while the master cylinder is supported on the front booster wall, so that forward thrust loaded on the master cylinder under the oil pressure inside the master cylinder pressure chamber produced by means of the booster device is transmitted to the automobile body through the booster shell. Accordingly, under the necessity of sufficient rigidity for bearing the thrust loading, the booster shell has hitherto been made from steel plates, aluminum alloys, etc. of sizable thickness causing a problem of considerable increase in weight thereof.

For reducing the weight of the booster shell, it has recently been proposed that the thrust loading be transmitted to the automobile body through a tie rod extending through the booster piston for connection of front and rear walls of the booster shell. To this end, a flexible bellows may be used for effectively sealing a tie rod through hole in the booster piston without preventing operation of the booster piston. The bellows is conventionally of very weak flexural rigidity and the middle portion thereof has a tendency to be weighed down and touch the upper side of the tie rod, so that the durability of the bellows may be decreased by rubbing the tie rod during repeated expansions and contractions of the bellows.

SUMMARY OF THE INVENTION

The present invention seeks to overcome the difficulties previously encountered in the art as described above and has for its primary object the provision of a new and improved automotive brake master cylinder vacuum booster device of the type described which comprises the bellows always made expansive owing to the pressure difference between the first and second chambers so as to increase the flexural rigidity for preventing direct contact thereof with the tie rod so that durability of the bellows is improved.

The above and other objects, features and advantages of the present invention will become apparent from the following description when taken in conjunction with the accompanying drawings, which illustrate a presently preferred embodiment of the invention.

DESCRIPTION OF THE PREFERRED EMBODIMENT

Figure 2:
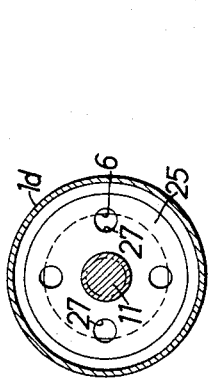
FIG. 2 is a cross section taken along the II—II line in FIG. 1.
Figure 1:
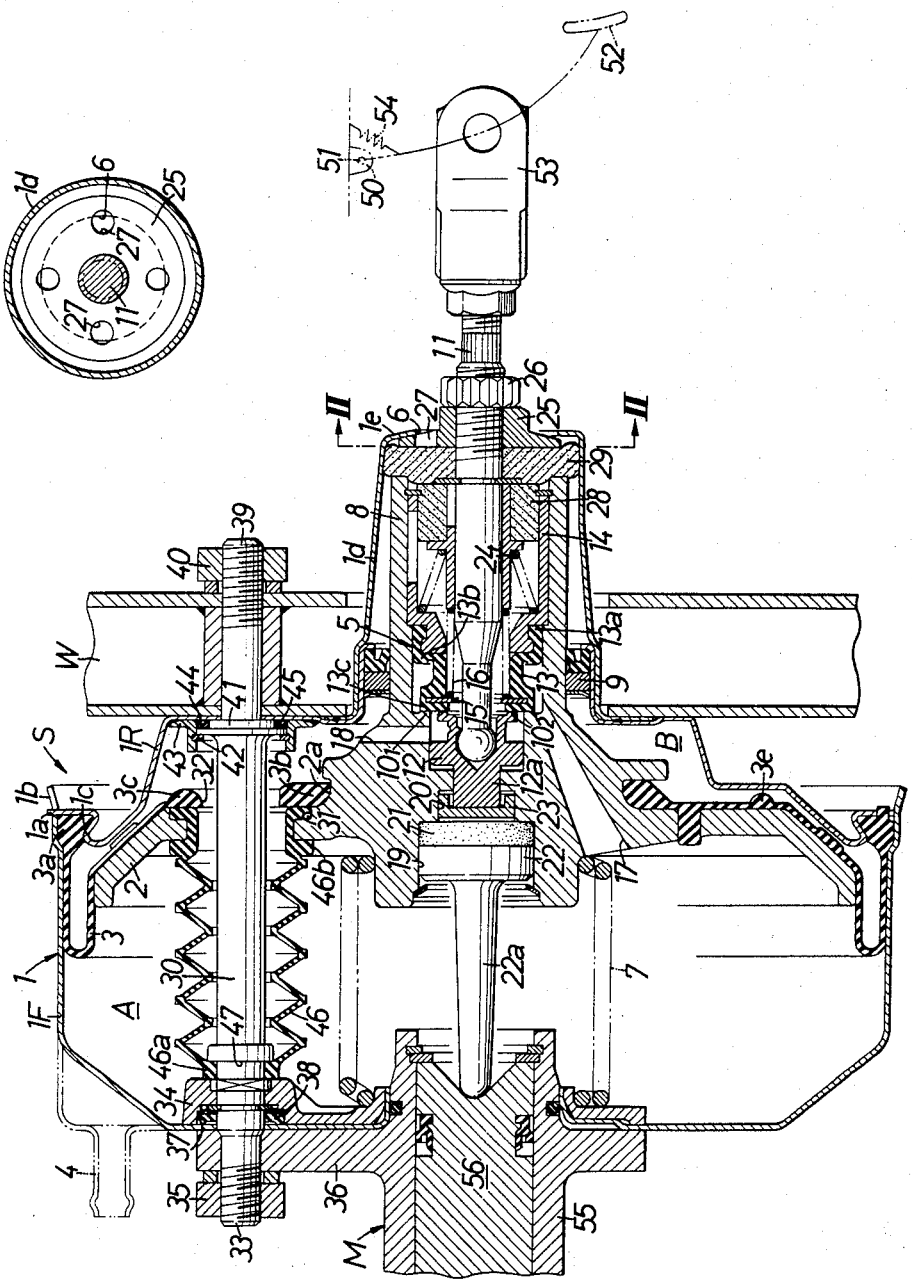
FIG. 1 is a longitudinal cross-sectional view in side elevation illustrating a preferred form of vacuum booster device embodying the present invention.

An embodiment of the present invention will be explained with reference to the drawings. In FIG. 1, a vacuum booster device, generally denoted by S, has a booster shell 1 which is composed of a pair of front and rear bowl-like parts 1F and 1R formed from light thin steel plate or synthetic resin. The rear bowl-like part 1R has a plurality of projections 1a formed around an opening of the rear bowl-like part 1R at equal circumferential intervals. The projections 1a are fitted to a plurality of notches 1b formed around an opening of the front bowl-like part 1F at equal circumferential intervals so as to position the bowl-like parts 1F and 1R in place. The parts 1F and 1R are connected together through singular or plural tie rods 30 extending between opposing front and rear walls thereof. The connection between the booster shell 1 and tie rods 30 will be described later in detail.

The interior space of the booster shell 1 is divided into a front side first working chamber A and a rear side second working chamber B by an axially slidable booster piston 2 accommodated therein, with a piston diaphragm 3 formed of such flexible materials as rubber or the like and joined to the rear face of the booster piston 2.

The piston diaphragm 3 is of annular shape as a whole and has annular beads 3a and 3b integrally formed, respectively, with outside and inside edges thereof and respectively fitted in annular grooves 1c and 2a respectively formed in a joining portion of both the bowl-like parts 1F and 1R and in a rear face of the booster piston 2. The first working chamber A is always held in communication with a source of vacuum supply in the form of an intake manifold, not shown, of an associated internal combustion engine through a vacuum inlet pipe 4, while the second working chamber B is selectively placed in communication with the first working chamber A or an air inlet port 6 open to the end wall 1e of a rearward extension tube 1d of the booster shell 1 through a control valve 5 which will be described later in detail.

The booster piston 2 is normally biased rearward, or toward the second working chamber B by a restoring spring 7 arranged under compression in the first working chamber A. The rearward travel of the booster piston 2 under the spring bias is limited by projections 3e formed on the rear face of the piston diaphragm 3 for abutting engagement with the rear wall inside of the booster shell 1.

The booster piston 2 and the piston diaphragm 3 are respectively provided with through holes 31 and 32 for passing tie rods 30 therethrough. The through hole 32 is open to the front face of the piston diaphragm 3 separable from the booster piston 2, and an annular bead 3c is integrally formed around a peripheral edge of the through hole 32.

A tubular valve casing 8 is integrally formed with the booster piston 2; rearwardly extended from the booster piston 2 coaxially therewith; slidably supported by a plain bearing 9 fitted inside the extension tube 1d; and open to the air inlet port 6 at the rear end thereof.

The control valve 5 is constructed inside the tubular valve casing 8 as follows: An annular first valve seat $10_1$ is formed on the inside of the front wall of the tubular valve casing 8; a valve piston 12 connected to an input rod 1 is slidably fitted in the front part of the valve casing 8; and an annular second valve seat $10_2$ encircled by said first valve seat $10_1$ is formed at the rear end of the valve piston 12.

A cylindrical valve element 13 with both ends opened is held at its base end portion 13a between the inside wall of the valve casing 8 and the outer periphery of a valve retainer sleeve 14 fitted inside the valve casing 8.

The valve element 13 is formed from elastic materials such as rubbers or the like, and has a thin diaphragm 13b inwardly extending radially from the base end portion 13a, and a thick valve portion 13c formed at the inner end of the diaphragm 13b and opposed to the first and second valve seats $10_1$ and $10_2$. The valve portion 13c is axially movable owing to the deformation of the diaphragm 13b and capable of abutting engagement with the front end surface of the valve retainer sleeve 14.

An annular reinforcing plate 15 is inlaid in the valve portion 13c and is worked by a valve spring 16 for assisting the valve portion 13c in movement toward both the valve seats $10_1$ and $10_2$.

A space radially outside of the first valve seat $10_1$, a middle space between both the first and second valve seats $10_1$ and $10_2$, and a space radially inside of the second valve seat $10_2$ are respectively in communication with the first working chamber A, the second working chamber B and the air inlet port 6 respectively through a through hole 17 formed in the booster piston 2, another through hole 18 and a space inside the valve element 13.

The booster piston 2 is provided with a large hole 19 opened in the front center thereof and a small hole 20 opened at the recessed end of the large hole 19. An elastic piston 21 made from rubber or the like and an output piston 22 of the same diameter with the former are slidably fitted in the large hole 19 in order from the recessed end thereof while a reaction piston 23 of smaller diameter than the elastic piston 21 is slidably fitted in the small hole 20. A small shaft 12a projected from the front end surface of the valve piston 12 is protruded into the small hole 20 and opposed to the rear end surface of the reaction piston 23. The output piston 22 is integrally formed with a forwardly projected output rod 22a.

The input rod 11 is normally biased rearward by a restoring spring 24 and the rearward travel thereof is limited by abutting engagement of a movable stopper plate 25 screw-fitted to the input rod 11 with the end wall inside of the rearward extension tube 1d. The axial location of the input rod 11 is changed by turning the screw-fitted movable stopper plate 25 and accordingly the retarding limit of the input rod 11 can be adjusted both forward and rearward. The movable stopper plate 25 is fixed after the adjustment by fastening a lock nut 26 also screw-fitted to the input rod 11. The movable stopper plate 25 is provided with an air vent 27 for preventing the blocking of the air inlet port 6.

Air filter elements 28 and 29 are fitted in the outer end opening of the tubular valve casing 8 for purifying the air induced through the air inlet port 6 and transformable in order not to prevent the operation of the input rod 11.

The mechanism for connection of the tie rods 30 and the booster shell 1 is now described.

The tie rod 30 is integrally formed with a mounting bolt 33 which is passed through and forwardly protruded from the front wall of the booster shell 1, and a spring retainer plate 34 is closely fitted to the front wall inside of the booster shell 1. The tie rod 30, the spring retainer plate 34 and the front wall of the booster shell 1 are integrally connected with a mounting flange 36 of the brake master cylinder M placed on the front surface of the booster shell 1 by fastening a nut 35 screwed in the tip end of the mounting bolt 33 passed through the mounting flange 36. On this occasion, an annular sealing material 38 is filled in an annular groove 37 encircling the bolt 33 and formed in the front surface of the spring retainer plate 34 and is airtightly brought into contact with the bolt 33, spring retainer plate 34 and the front wall inside of the booster shell 1. With this arrangement, leakage through the two paths, between front wall inside of the booster shell 1 and the spring retainer plate 34 and between the spring retainer plate 34 and the bolt 33, can be prevented by the use of the single annular sealing material 38. The fixed end of the restoring spring 7 is supported by the spring retainer plate 34 so that springing force of the restoring spring 7 is loaded to the tie rod 30 to eliminate the loading on the booster shell 1.

Furthermore, the tie rod 30 is integrally formed with a mounting bolt 39 which is passed through and rearwardly protruded from the rear wall of the booster shell 1 and a stepped flange 41 for abutment against the rear wall inside of the booster shell 1. The stepped flange 41 is fitted in a support cylinder 43 welded to the rear wall inside of the booster shell 1 and, by setting a snap ring 42 in the support cylinder 43, the tie rod 30 and the rear wall of the booster shell 1 are connected together. On this occasion, an annular sealing material 45 is filled in an annular groove 44 between the smaller step of the stepped flange 41 and the support cylinder 43.

The tie rod 30 is fixed to the front wall W of the compartment by fastening a nut 40 screwed in the tip end of the mounting bolt 39 passed through the front wall W of the automobile compartment.

In this way, the booster shell 1 is fitted to the front wall W of the compartment through the tie rods 30, while the brake master cylinder M is supported by the booster shell 1 through the tie rods 30.

A sealing means is arranged between a through hole 31 in the booster piston 2 for passing the tie rod 30 therethrough and the tie rod 30 in such a manner as not to prevent the operation of the booster piston 2. The sealing means comprises a flexible bellows 46 made from elastic material such as rubber or the like. The bellows 46 surrounds the tie rod 30 inside the first working chamber A and the front and rear ends 46a and 46b of the bellows 46 are tightly fixed respectively to an annular groove 47 located at the front end outside of the tie rod 30 and the through hole 31 in the booster piston 2. Further, the through hole 32 is sealed with the bellows 46 by closely but separably mating the rear end 46b of the bellows 46 and the front surface of the annular bead 3c of the piston diaphragm 3.

The inside of the bellows 46 is always held in communication with the second working chamber B through the through hole 32 in the piston diaphragm 3.

Inside the compartment, a brake pedal 52 jointed at 51 to the fixed bracket 50 is connected to the rear end of the input rod 11 of the booster device S through an adjustable pedal link 53. Reference number 54 indicates a restoring spring for rearwardly retarding the brake pedal 52.

A cylinder body 55 of the brake master cylinder M is passed at its rear end through the front wall of the booster shell 1 and protruded into the first working chamber A and a working piston 56 inside the cylinder body 55 is opposed at its rear end to the output rod 22a of the booster device S.

Description will next be made of the operation of the embodiment described above.

Figure 3:
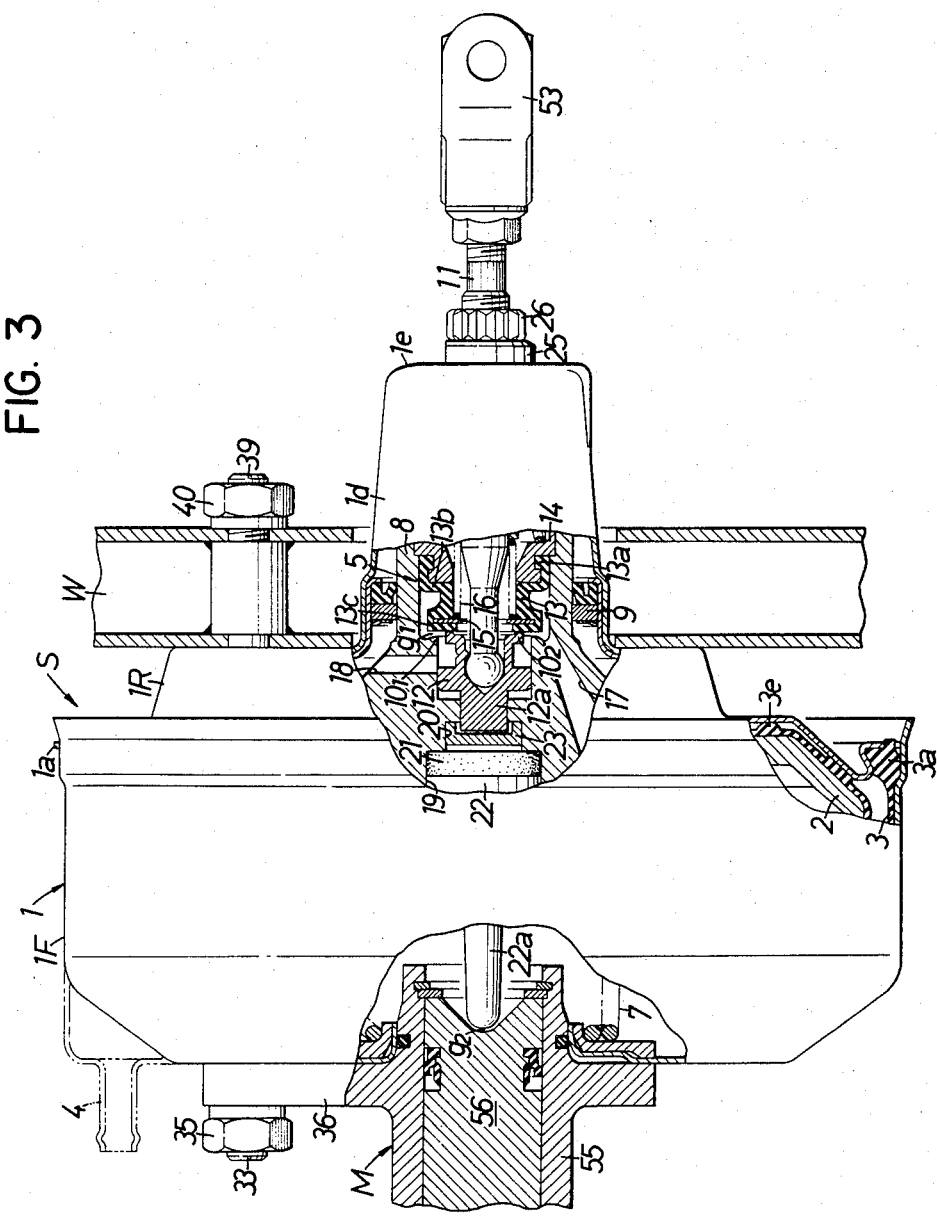
FIG. 3 is a partly cutaway longitudinal side elevational view, showing the device of FIG. 1 in its state assumed before the rearmost limit of stroking movement of the input rod is adjusted.

When the brake master cylinder M and the booster device S have been jointed together in the assembling stage, as seen in FIG. 3, the booster piston 2 generally lies in its fully retracted position with the projection 3e held in abutting engagement with the rear wall inside of the booster shell 1 and axial gaps $g_1$ and $g_2$ are respectively defined between the first valve seat $10_1$ and the valve portion 13c and between the working piston 56 and the output rod 22a.

Thereupon, first, the vacuum inlet pipe 4 is connected to the vacuum supply source to apply a vacuum to the first working chamber A and, under this condition, the movable stopper plate 25 on the input rod 11 is gradually shifted rearward relative to the input rod 11 in the previously described manner. In this way, the input rod 11 gradually moves forward under the reaction with the stopper plate 25 thereby eliminating the gaps $g_1$ and $g_2$. Subsequently, the movable stopper plate 25 is fixed in position by means of the lock nut 26.

In the above procedure, as the input rod 11 is advanced relative to the shifted stopper plate 25, the valve portion 13c is seated under the bias of the valve spring 16 against the first valve seat $10_1$ so that both the working chambers A and B are disconnected from each other and the gap $g_1$ is eliminated first. As the input rod 11 is further advanced, the second valve seat $10_2$ is separated from the valve portion 13c, so that the second working chamber B is brought into communication with the air inlet port 6 through the through hole 18 and the inside of the valve element 13, the air filtrated through the filters 28 and 29 is induced to the second working chamber B. Consequently, the second working chamber B becomes of higher pressure than the first working chamber A and, due to such pressure difference, the booster piston 2 works forward advancing the output rod 22a against the restoring spring 7. When the output rod 22a abuts slightly against the working piston 48, or, when said gap $g_2$ is eliminated, the movable stopper plate 25 is fixed to the input rod 11 and the advance of the input rod 11 is stopped, while the valve portion 13 is seated against the second valve seat $10_2$ with the forward working of the booster piston 2 as being seated against the first valve seat $10_1$. Consequently, as shown in FIG. 1, the control valve 5 is placed in a neutral state retaining the second working chamber B at a slightly higher pressure than the first working chamber A, that is, the second working chamber B is held out of communication with both the first working chamber A and atmosphere. On this occasion, balance of the forces applied to the booster piston 2 means the balance of the advancing force of the booster piston 2 due to the pressure difference between both the working chambers A and B and the restoring force of the restoring spring 7, and the stop positions of the booster piston 2 and the input rod 11 in this condition are respectively the normal full-retracted positions of both.

Owing to the pressure difference between the working chambers A and B, the bellows 46 becomes expansive and the flexural rigidity thereof is increased, so that the direct contact thereof with the tie rod 30 caused by the deflection of the central portion thereof is prevented.

In the brake operation, when the brake pedal 52 is depressed and the input rod 11 and the valve piston 12 are advanced, the second valve seat $10_2$ is separated from the valve portion 13c so that the second working chamber B is placed into communication with the air inlet port 6 through the through hole 18 and the inside of the valve element 13. Thus, the atmospheric air is induced into the second working chamber B without delay and the chamber B becomes of higher pressure than the first working chamber A, then, owing to the pressure difference between both the chambers A and B, the booster piston 2 is moved forwardly against the restoring spring 7 to advance the output rod 22a through the elastic piston 21 and immediately drive forward the working piston 56 in abutting engagement with the output rod 22a so that the brake master cylinder M can operate upon depression of the brake pedal 52 without any delay.

When the working piston 56 is driven, the forward thrust load is applied to the cylinder body 55 as referred to above and is transmitted therefrom to the automobile body, that is, front wall W of the compartment and supported through the tie rod 30.

The load is, therefore, not applied to the booster shell 1.

On the other hand, when the small shaft 12a of the valve piston 12 is advanced and abutted against the elastic piston 21 through the reaction piston 23, the reaction force of the output rod 22a is partly fed back to the brake pedal 52 side through the valve piston 12 owing to the expansion toward the reaction piston 23 side of the elastic piston 21 caused by the reaction force of the output rod 22a, so that the output of the output rod 22a, or the braking force, can be detected by the drivers.

Subsequently, when the depression on the brake pedal 52 is released, the input rod 11 is retracted under the reaction force acting on the valve piston 12 and the biasing force of the restoring spring 24 to return to its normal, full-retracted position in which the movable stopper plate 25 is in abutting engagement with the end wall 1e. Simultaneously with this, the valve portion 13c is moved away from the first valve seat $10_1$ to place the working chambers A and B in communication. When the pressure difference between the working chambers A and B disappears, the booster piston 2 is retracted without delay under the bias of restoring spring 7 to a position slightly past the normal full-retracted position as shown in FIG. 1 so that the valve portion 13c is seated on the first valve seat $10_1$ and at the same time is slightly separated from the second valve seat $10_2$ to induce the atmospheric air into the second working chamber B. Consequently, the booster piston 2 is advanced until the control valve 5 takes a neutral state and is stopped by the balance of force as aforesaid.

If the brake pedal 52 is depressed and the booster piston 2 is advanced while the vacuum pressure is not accumulated in the first working chamber A, the air inside the first working chamber A is not sufficiently discharged into the vacuum supply source due to the resistance inside the pipe line or the like, so that the remaining air inside the first working chamber A is compressed. When air pressure of the second working chamber B is exceeded by that of the first working chamber A, a portion of the remaining air inside the first working chamber A enters a space between the rear surface of the booster piston 2 and the front surface of the piston diaphragm 3 and the annular bead 3c is thereby separated from the rear end 46b of the bellows, so that both the working chambers A and B are placed in communication with each other through clearances between the annular bead 3c and the rear end 46b of the bellows and through the through holes 32 in the piston diaphragm 3. Therefore, such troubles as the rearwardly swelling transformation in the piston diaphragm 3 caused by excessive rearward pushing forces can be prevented since the air pressures inside both the working chambers A and B become balanced with each other without delay through the clearances and the through hole 32.

When above pressure difference is eliminated, the annular bead 3c is again placed into close contact with the rear end 46c of the bellows.

What is claimed is:

1. A vacuum booster device comprising a booster shell having a front wall and a rear wall, an axially slideable booster piston accommodated in the booster shell, a first working chamber defined in the booster shell by said front wall and the booster piston and held in communication with source of vacuum supply, a second working chamber defined in the booster shell by said rear wall and the booster piston and slectively placed in communication with the first working chamber or the external atmosphere through a control valve means, an input rod arranged opposite the booster piston for movement toward and away from the latter and connected to the control valve means so as to produce a pressure difference between both the working chambers effective to cause the booster piston to follow forward movement of the input rod, tie rods extending through the booster piston interconnecting said front and rear walls of the booster shell and passing through a through hole in said piston, flexible bellows surrounding each of the tie rods and having opposite ends fixed to an end of the tie rod adjacent said front wall and around said opening in the booster piston, respectively, so that the inside of the flexible bellows communicates continuously with the second working chamber, an adjustable stop means provided on the input rod for defining a retraction limit of the latter so as to create a pressure difference between said first and second working chambers when the input rod is in it is full-retreated position and the control valve means is held in a neutral postion keeping the second working chamber cut off from its communication with both the first working chamber and external atmosphere so that the bellows becomes expansive owing to said pressure difference between the working chambers, a piston diaphragm which cooperates with said booster piston to divide the interior of said booster housing into said first and second working chambers, said flexible bellows having a rear end tightly fixed to said through hole of the booster piston while said piston diaphragm having a through hole for said tie rod passing therethrough, and an annular bead being integrally formed around a peripheral edge of said through hole of the piston diaphragm, which annular bead has it front surface separably mated with said rear end of the flexible bellows to provide a seal to said through hole of the piston diaphragm.

2. A device as set forth in claim 1 wherein the adjustable stop means comprises a movable stop plate fitted to the input rod through screw threads for limiting the extent of retracting movement of the input rod by being abutted by the booster shell when the input rod is fully retracted.

* * * * *